3,512,954
AQUATIC HERBICIDES
Obren Keckemet, Tacoma, Wash., assignor to Pennwalt Corporation, a corporation of Pennsylvania
No Drawing. Filed Aug. 3, 1967, Ser. No. 658,062
Int. Cl. A01n 9/00
U.S. Cl. 71—66       6 Claims

ABSTRACT OF THE DISCLOSURE

Control of plant life in ponds, lakes, and other bodies of water by use of certain long chain amine salts of hexafluoroarsenic or hexafluorophosphoric acids.

---

Numerous chemical agents are known to control (i.e. kill or inhibit) aquatic plant growth, but each agent has disadvantages which limit its usage. For example, some agents may effectively control one species of aquatic plant life, but be of little or no value with others. Still other agents are known which have limited utility because of their high cost, as, for example, silver compounds. Thus, there exists the need for improved means to effectively control the many varieties of undesirable weeds, fungi, and algae existing in bodies of water.

Hexafluoroarsenates and hexafluorophosphates are disclosed as terrestrial herbicides in U.S. Pat. 3,189,428. However, these acids and their simple alkali metal, ammonium, and amine salts are of no value as aquatic herbicides. We have now found surprisingly that a highly specific group of tertiary amine salts of hexafluoroarsenic acid and hexafluorophosphoric acid are extremely effective aquatic herbicides. Accordingly, this invention is concerned with a method for controlling aquatic plant growth by contacting aquatic plants with an effective amount of a tertiary amine salt of a fluorine containing acid selected from the group of hexafluoroarsenic acid and hexafluorophosphoric acid, wherein said tertiary amine salt is of the structure

where $R_1$ and $R_2$ are lower alkyl groups or

groups ($n$ being an integer from 1 to about 10), and $R_3$ is an alkyl group containing from about 6 to about 18 carbon atoms. It will be understood that $R_1$ and $R_2$ may be the same or different lower alkyl groups (e.g. methyl, ethyl, propyl, n-butyl, isobutyl, etc.) and that the $R_3$ radical may be a straight or branched chain alkyl group.

One group of amines from which the salts of the hexafluoroarsenic acid and hexafluorophosphoric acid are obtained for this invention are those tertiary alkyl amines derived from the well-known aliphatic hydrocarbon amines obtained by reductive amination of the acids from animal fats, vegetable oils, particularly tallow and coconut acids which have predominantly 12 or 18 carbon atoms in the chain. Of particular value are the coconut oil amines (predominantly 12 to 14 carbon atoms) which have been converted to tertiary amines by alkylation. However, other tertiary amines within the above structural configuration are also operable in this invention and such amines may be obtained by the amination and subsequent alkylation of oleic, linoleic, tallow, and soya acids. Alternatively, these tertiary amines may be obtained by conversion of the acids to an amine with a di-lower alkyl secondary amine, followed by reduction of the carbonyl group. Specific amines which may be used to form salts from such amines are N,N-dimethyllauryl amine, N,N-dimethylmyristylamine, N,N - dipropylstearylamine and the like. However, because of availability and cost, mixtures of amines will preferably be used such as the mixtures found in N,N-dimethylcocoamine, N,N-dimethyltallowamine, N,N-dimethylsoyamine, etc. The methods of making these amines are well-known, the various processes being disclosed in the book by Astle entitled "Industrial Organic Nitrogen Compounds" (Reinhold, 1961). Likewise, the ethoxylated amines are well known compounds made by reacting the long chain primary or secondary amine with one or more moles of ethylene oxide.

In addition to the above amines, which contain straight chain alkyl groups in the $R_3$ component, tertiary alkyl amines where $R_3$ is a branched chain, are useful and are particularly preferred. Such amines will be derived from long chain alcohols made by the Oxo process. This process is well-known in the art and is described in the book "Higher Oxo Alcohols," published 1957 by Enjay Company, Inc. (Library of Congress, catalog card No. 57–13148). Of particular interest is the N,N-dialkyltridecylamine of the structure

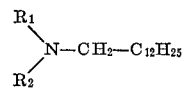

where $R_1$ and $R_2$ groups are lower alkyl groups as above defined and where the —$C_{12}H_{25}$ moiety is branched. Page 33 of the above text on oxo alcohols describes in detail the tridecyl alcohol from which this amine may be derived. The oxo alcohol is converted to the amine by reaction with the di-lower alkylamine (e.g. dimethylamine) under conditions of heat and pressure in the presence of alumina as a catalyst as described in U.S. 2,043,965, whereby the dialkyltridecylamine is obtained. The structure of the amine is in accord with the oxo reaction products in that the long chain alkyl group attached to the nitrogen atom is attached by a primary carbon (i.e. —$CH_2$—N<), but the long chain alkyl group is a branched chain radical. This structure of the amine is due to the fact that the oxo process always results in a major proportion of branched chain products being obtained. Thus, oxo tridecyl alcohols is a polybranched chain primary aliphatic alcohol prepared from tetrapropylene by the oxo process and on conversion to the amine with dimethylamine becomes a polybranched chain tertiary amine of the formula $C_{12}H_{25}$—$CH_2$—N—$(CH_3)_2$.

The preparation of the amine salt is readily carried out without need of critical controls simply by contacting the desired amine with a stoichiometric amount of the fluorophosphoric acid (e.g. hexafluoroarsenic acid or hexafluorophosphoric acid). The temperature for the reaction will usually be between about 30 and 90° C. and the process is completed in a short time.

The following examples illustrate various formulations of the amine salts useful in the invention (all percentages are by weight).

EXAMPLE I

Dimethylcocoamine salt of hexafluoroarsenic acid

| | Percent |
|---|---|
| 55% hexafluoroarsenic acid | 33.33 |
| Dimethylcocoamine | 28.57 |
| Acetone | 14.29 |
| Diacetone alcohol | 14.29 |
| Xylene | 4.76 |
| Triton X-161 | 4.76 |

EXAMPLE II

Dimethyltridecylamine salt of hexafluoroarsenic acid

| | Percent |
|---|---|
| 65% hexafluoroarsenic acid tech. | 29.78 |
| Dimethyltridecylamine tech. | 23.83 |
| Isopropanol | 35.90 |
| Xylene | 5.24 |
| Diacetone alcohol | 5.25 |

EXAMPLE III

Dimethyltridecylamine salt of hexafluorophosphoric acid

| | Percent |
|---|---|
| 65% hexafluorophosphoric acid | 31.53 |
| Dimethyltridecylamine tech. | 31.53 |
| Isopropanol | 25.83 |
| Xylene | 5.55 |
| Diacetone | 5.56 |

EXAMPLE IV

Dimethyl tallowamine salt of hexafluorophosphoric acid

| | Percent |
|---|---|
| 65% hexafluorophosphoric acid | 27.17 |
| Dimethyl tallowamine | 55.27 |
| Isopropyl alcohol | 17.56 |

EXAMPLE V

Dimethylcocoamine salt of hexafluorophosphoric acid

| | Percent |
|---|---|
| 65% hexafluorophosphoric acid | 35.64 |
| Dimethylcocoamine | 34.29 |
| Acetone | 30.07 |

The compounds described above act as contact poisons and aquatic weed control is achieved by treating the area with sufficient material to maintain a given strength with active ingredient in the water surrounding the exposed tissue surface area of the plant. The activity of the above described compounds is so high that satisfactory control may be obtained with a concentration of less than 1 part per million of active ingredient solution in the water surrounding the plants. For most applications where an entire area such as a pond or lake is treated, concentrations of about 0.25 to 10 p.p.m. will be quite effective. The preferred concentration range will usually be between about 1 to 3 p.p.m. For resistant weeds the dosage of up to about 5–10 p.p.m. may be employed. Alternatively, the concentrations used may be expressed in terms of pounds per acre foot of water and in this mode of expression ratios of application will be used varying from 0.7 to 27 pounds of active ingredient per acre foot of water.

The manner in which the water area may be treated will vary with the specific problems encountered. Although aqueous solutions are usually preferred for economic reasons, solutions of the amine salts in other solvents may be used and such solutions used for the water treatment.

Treatment is accomplished best by spraying on the water or by injection just below the water surface with distribution as evenly as possible in the area to be treated. Spraying equipment is preferably used with aqueous solutions and because the agent is applied as an aqueous solution no problem of preparation, operation or cleaning is involved. In general, the diluted treating solution will contain about 10% to about 25% by weight of active ingredient. Although the product is water soluble at the concentrations used, it may frequency be desirable to incorporate a small amount of a dispersant as a mixing aid in the initial concentrate used to prepare the diluted treating solutions. For this purpose isopropyl alcohol, diacetone alcohol or other water soluble alcohols or ketones may be used. Where a dispersant is used the formulated concentrate will usually contain from about 15% to 30% of the dispersing agent. In order to aid in the estimation of the gallonage of a 20% active aqueous solution for various pond sizes the following table is given:

TABLE 1

[Approximate gallons of 20% active agent concentrate needed to treat one acre of pond surface (approx. 208′ by 208′)]

| Pond depth, ft. | For dosage of— | |
|---|---|---|
| | 0.5 p.p.m. (gals.) | 1.0 p.p.m. (gals.) |
| 1 | 0.65 | 1.3 |
| 2 | 1.3 | 2.6 |
| 3 | 1.95 | 3.9 |
| 4 | 2.6 | 5.2 |
| 5 | 3.25 | 6.5 |
| 6 | 3.9 | 7.8 |

As is evident from the table the concentrations and depths are directly proportional and other concentrations and depth requirements may be calculated accordingly.

In addition to treating the area with a solution by a spraying technique the treating agents may also be formulated in a granular form and applied by any of the variety of manual, electrical and gas powered whirling spreaders on the market and which can be adapted for use on boats. This granular formulation consists of an approximately 1% to 10% (preferably about 5%) concentration of active agent deposited on any inert material such as attapulgite, bentonite and other inert adsorbent granulated clays having a size range of about 8 to 30 mesh (U.S. sieve size).

The granular formulations can be simply prepared by spraying the liquid active ingredient or concentrates thereof into the granular inert carrier in a rotating or other suitable blender common to the trade for preparation of pesticide formulations. Although the granulated formulations can be prepared containing from 1 to 25% of active ingredient it has been found that 5% of the active ingredient is generally the best concentration to use for obtaining good distribution when the formulation is applied. To treat one acre of water surface with a 5% by weight granular formulation at a level of one part per million of active agent will require 55 pounds of the granular material for each foot of pond depth. Since again the depth of pond and the dose concentration are directly proportional, the amount of granular material for other depths and at other concentrations may be readily calculated. Use of a granular formulation is advantageous for control of submerged algae since the granular agent sinks to the bottom of the pond. In addition, other formulations containing active ingredients can be used such as wettable powder and pellets. A spreader sticker or wetting agent can be used in certain cases in order to increase "plating" on plants and/or better penetration into plants resulting in faster kill and/or more complete kill of plants.

As indicated, the active agents described above are effective in accord with this invention for the control of plant life in aquatic systems. One of the particular advantages of the invention is that it enables a wide variety of plant life to be controlled with a single active ingredient, i.e. the agents have broad spectrum activity. The salts as described above are effective against practically all aquatic plants and growth which cause problems on lakes, ponds, rivers, streams, etc. Thus, the invention is useful in controlling pondweeds (Potamogeton spp.), including bassweed, curly leaf pondweed, floating-leaf pondweed, sago pondweed, flat-stem pondweed, bushy pondweed (Naias spp.), horned pondweed (Zanichellia sp.) coontail (Ceratophyllum sp.), water milfoil (Myriophyllum spp.), mud plantain and water stargrass (Heteranthera spp.), bladderwort (Ultricularia spp.) burr weed (Sparganium spp.), tapegrass, wild celery, belgrass (Vallisneria sp.) waterweed (Elodea spp.), members of the duckweed family, such as big duckweed (Spirodella sp.), duckweed (Leman spp.), watermeal (Wolffia spp.), stonewort and muskgrass, (Caara spp.).

In addition to use in ponds and lakes, this invention is applicable to the control of algae and slime forming bacteria in cooling towers and other water recirculating systems as used in paper manufacturing processes for example, in drainage ditches and other water flowing sites.

Test evaluations

The following table illustrates the high effectiveness of the amine salt compounds described above against several types of weeds at 1 part per million.

TABLE A

[Effect of various salts of hexafluoroarsenic acid and hexafluorophosphoric acid against various aqueous weeds]

| Agent tested | Percent kill at 1 p.p.m. | | |
|---|---|---|---|
| | Naiad | Elodea | Coontail |
| Dimethyltridecylamine salt of hexafluoroarsenic acid | 100 | 100 | 100 |
| Dimethyltridecylamine salt of hexafluorophosphoric acid | 100 | 100 | 100 |
| Dimethylcocoamine salt of hexafluoroarsenic acid | 99 | 100 | 100 |
| Dimethylcocoamine salt of hexafluorophosphoric acid | 100 | 100 | 100 |
| Tallow N$\diagdown^{(CH_2CH_2O)_nH}_{(CH_2CH_2O)_mH}$ (n+m=5) Salt of hexafluorophosphoric acid | 92 | 82 | 100 |
| Tetraethylammonium hexafluoroarsenate | 0 | 0 | 0 |
| Potassium hexafluoroarsenate | 0 | 0 | 0 |
| Dibutylammonium hexafluoroarsenate | 0 | 0 | 0 |
| Benzyl trimethylammonium hexafluoroarsenate | 0 | 0 | 0 |
| Morpholine hexafluorophosphate | 0 | 0 | 0 |
| Diethylamine hexafluorophosphate | 0 | 0 | 0 |
| Dimethylamine hexafluoroarsenate | 0 | 0 | 0 |

As can be seen from the above table all the tertiary amine salts tested are highly effective whereas the common alkali metal salts, ammonium salts, quaternary ammonium salt, lower alkyl amine salts and cyclic amine salts are completely ineffective against aqueous weeds at comparable concentrations. The following Table B indicates the activity of some of the agents described above at various concentrations:

TABLE B

[Effects of various salts of $H_2AsF_6$ and $H_2PF_6$ against aquatic weeds at various concentrations]

| Aquatic weed | Concentration | $K_2AsF_6$ | $(NH_4)_2PF_6$ | Dimethyltridecylamine salt of— | |
|---|---|---|---|---|---|
| | | | | $H_2AsF_6$ | $H_2PF_6$ |
| Naiad | 0.5 p.p.m. | | | 100 | 93 |
| | 1 p.p.m. | 0 | 0 | 98 | 100 |
| | 2 p.p.m. | | | 100 | 100 |
| | 5 p.p.m. | 23 | 0 | 100 | 100 |
| | 10 p.p.m. | 50 | 0 | 100 | 100 |
| Elodea | 0.5 p.p.m. | | | 60 | 100 |
| | 1 p.p.m. | 0 | 0 | 78 | 100 |
| | 2 p.p.m. | | | 100 | 100 |
| | 5 p.p.m. | 5 | 0 | 100 | 100 |
| | 10 p.p.m. | 5 | 0 | 100 | 100 |
| Coontail | 0.5 p.p.m. | | | 73 | 100 |
| | 1 p.p.m. | 0 | 0 | 100 | 100 |
| | 5 p.p.m. | | 0 | 100 | 100 |
| | 2 p.p.m. | | | 100 | 100 |
| | 10 p.p.m. | 0 | 0 | 100 | 100 |
| Hyacinth | 2 lbs./acre | 0 | 0 | 20 | 43 |
| | 4 lbs./acre | 0 | 5 | 75 | 87 |
| Alligator weed | 5 lbs./acre | 0 | 0 | 10 | 23 |
| | 10 lbs./acre | 0 | 0 | 27 | 40 |

It is clear also from Table B that the tertiary amine salts of the hexafluoroarsenic acid and hexafluorophosphoric acid are extremely active whereas the potassium and ammonium salts illustrated in the same table are without any substantial effect.

It will be understood that numerous variations may be made from the above description and examples illustrated in the invention without departing from it.

I claim:
1. A process for control of aquatic plant life which comprises contacting aquatic plants with an effective amount of tertiary amine salt of a fluorine containing acid selected from the group of hexafluoroarsenic acid and hexafluorophosphoric acid, wherein said tertiary amine salt has the structure

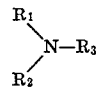

where $R_1$ and $R_2$ are lower alkyl groups or $$(CH_2CH_2O)_nH$$

groups, $n$ having an integer from 1 to about 10, and $R_3$ is an alkyl group containing from about 6 to about 18 carbon atoms.

2. The process of claim 1 where the tertiary amine salt is the dimethyltridecylamine salt of hexafluoroarsenic acid.

3. The process of claim 1 where the tertiary amine salt is the dimethyltridecylamine salt of hexafluorophosphoric acid.

4. The process of claim 1 where the tertiary amine salt is the dimethylcocoamine salt of hexafluoroarsenic acid.

5. The process of claim 1 where the tertiary amine salt is the dimethylcocoamine salt of hexafluorophosphoric acid.

6. The process of claim 1 where the tertiary amine salt is

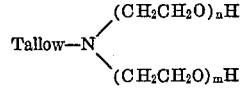

where $n+m=5$.

References Cited

UNITED STATES PATENTS 3,419,382  12/1968  Culves _____ 71—128

JAMES O. THOMAS, Jr., Primary Examiner